United States Patent
Takahashi et al.

(10) Patent No.: US 6,604,201 B1
(45) Date of Patent: Aug. 5, 2003

(54) NETWORK UNIT WITH POWER SAVING MODE INHIBIT BASED ON INTERCONNECTION RELATIONSHIP TO NEIGHBORING NODES WHICH IS STORED ON THE UNIT

(75) Inventors: Satoshi Takahashi, Osaka (JP); Hiroyuki Yamauchi, Osaka (JP); Hironori Akamatsu, Osaka (JP); Tadahiro Yoshida, Osaka (JP); Yutaka Terada, Osaka (JP); Yukio Arima, Osaka (JP); Takashi Hirata, Osaka (JP); Yoshihide Komatsu, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/428,277

(22) Filed: Oct. 27, 1999

(30) Foreign Application Priority Data

Oct. 28, 1998 (JP) ............................................. 10-306601

(51) Int. Cl.[7] ................................................. G06F 1/32
(52) U.S. Cl. ........................................ 713/323; 455/574
(58) Field of Search ......................... 713/323; 455/13.4, 455/574

(56) References Cited

U.S. PATENT DOCUMENTS

| 5,450,073 A | * | 9/1995 | Brown et al. ................. 340/3.1 |
| 5,483,656 A | * | 1/1996 | Oprescu et al. .............. 700/297 |
| 5,692,197 A | | 11/1997 | Narad et al. ................. 713/323 |
| 5,790,876 A | * | 8/1998 | Shima et al. ................ 713/320 |
| 6,131,167 A | * | 10/2000 | Cruz ........................... 713/300 |
| 6,526,295 B1 | * | 2/2003 | Shull ........................... 455/574 |

FOREIGN PATENT DOCUMENTS

| JP | 07093061 | 4/1995 |
| JP | 8-221163 | 8/1996 |
| JP | 8-509081 | 9/1996 |
| JP | 10-70651 | 3/1998 |
| JP | 10070561 A | 3/1998 |
| JP | 10-233791 | 9/1998 |
| JP | 10-303949 | 11/1998 |
| JP | 11-145993 | 5/1999 |
| JP | 11-234315 | 8/1999 |
| WO | WO 94/16378 | 7/1994 |
| WO | WO98/49807 | 5/1998 |

OTHER PUBLICATIONS

1394 Trade Association, "Power Specification Part 2: Suspend/Resume Implementation Guideline", Revision 1.0, 1999.*
R. Zheng and R. Kravets, "On–demand Power Management for Ad Hoc Networks", IEEE, INFOCOM, 2003.*
Notice of Reasons of Rejection dated Aug. 8, 2000 received from the Japanese Patent Office with English Translation.

* cited by examiner

Primary Examiner—Thomas Lee
Assistant Examiner—Albert Wang
(74) Attorney, Agent, or Firm—McDermott, Will & Emery

(57) ABSTRACT

A power-saving network unit, which is connected to a network made up of a plurality of power-saving network units, includes: network monitoring means; network information memory; power-saving mode setting means; peripheral I/O interface; and digital processor. The network monitoring means monitors a topology of the network, or the interconnection relationship among the power-saving network units. Every time the network has been modified, the network monitoring means stores the modified network topology on the network information memory. The power-saving mode setting means receives the network information stored on the network information memory. If the power-saving network unit is a master or relay node in the network, then the power-saving mode setting means locks the peripheral I/O interface and digital processor of the power-saving network unit to the normal operation mode and prohibits these sections from entering the power-saving mode.

11 Claims, 5 Drawing Sheets

NETWORK UNIT WITH POWER SAVING MODE INHIBIT BASED ON INTERCONNECTION RELATIONSHIP TO NEIGHBORING NODES WHICH IS STORED ON THE UNIT

BACKGROUND OF THE INVENTION

The present invention generally relates to a unit belonging to a network of units coupled together through transmission lines like cables (in this specification, such a unit will be called a "network unit"). More particularly, the present invention relates to an improved power-saving network unit that can transition either manually or automatically from a normal mode into a power-saving mode, in which the overall power consumption of the unit can be reduced.

In a conventional network of this type, each power-saving network unit enters a power-saving mode if the unit has not been accessed by, or has been disconnected from, other units for a predetermined time or more, as in IEEE 1394 standards or Japanese Laid-Open Publication No. 7-134628. Once the power-saving network unit has entered the power-saving mode (i.e., a sleep mode), the unit cannot perform its normal operation until the modes are switched again. Therefore, exchange of data through the built-in ports thereof connected to the transmission lines is also suspended for a while.

When another power-saving network unit demands access to the power-saving network unit that has entered the power-saving mode, the latter unit can readily transition back into the normal operation mode as disclosed in Japanese Laid-Open Publication No. 7-93061, for example.

In the conventional power-saving unit network, where a unit is connected to the other units through transmission lines, if the former unit has not been accessed by any other unit for a predetermined period or the number of times the unit in question has been accessed by other units during the period (in this specification, this number of times will be called a "frequency of accesses") is a preset one or less, then the unit enters the power-saving mode. Accordingly, even if the network unit in question is a relay node located between a pair of other network units, the former unit still enters the power-saving mode. Suppose data should be exchanged between the pair of network units by way of the network unit in the power-saving mode. First, the ports of the network unit in the power-saving mode should be enabled such that data can be exchanged therethrough. Then, the data should be transmitted from one of the pair of network units to the other through the network unit in the power-saving mode. Thus, in such a situation where data should be exchanged between a pair of normally operating network units via a network unit in the power-saving mode, it takes an additional time to exchange the data. In other words, the data exchange is delayed for the time needed to enable the ports of the network unit in the power-saving mode.

SUMMARY OF THE INVENTION

An object of the present invention is providing a power-saving network unit that can fulfill the requirements of high-speed operation and reduced power consumption at the same time. Specifically, if any network unit is needed for a pair of other network units to exchange data therethrough (e.g., if the former unit is a relay node therebetween), then the former unit is prohibited from entering the power-saving mode such that the data can be exchanged quickly.

To achieve this object, according to the present invention, it is determined whether or not each of power-saving units, which a network is made up of, may enter the power-saving mode by examining interconnection relationship among these power-saving units.

Specifically, a power-saving network unit according to the present invention is connected to a network made up of a plurality of units that are coupled together through transmission lines and is operative in either normal operation or power-saving mode. The power-saving network unit includes: information storage means for storing information representing a configuration of the network; and power-saving mode setting means for determining, based on the network configuration information stored on the storage means, whether or not the power-saving network unit may enter the power-saving mode.

In one embodiment of the present invention, the power-saving network unit may further include: peripheral I/O means connected to the network; and digital processing means for receiving information from other units in the network and processing the information. If the mode setting means has determined that the power-saving network unit may enter the power-saving mode, the peripheral I/O and digital processing means preferably receive an instruction signal from the mode setting means to enter the power-saving mode.

In another embodiment, if the power-saving network unit is master of the other units in the network, then the mode setting means preferably prohibits the power-saving network unit from entering the power-saving mode.

In still another embodiment, if the power-saving network unit is a relay node located between a pair of other units in the network, then the mode setting means preferably prohibits the power-saving network unit from entering the power-saving mode.

In yet another embodiment, if the power-saving network unit is neither master nor relay node in the network, then the mode setting means preferably removes prohibition against the power-saving network unit's entering the power-saving mode.

In yet another embodiment, the power-saving network unit may further include counting/comparing means for counting and/or comparing a frequency with which the power-saving network unit has been accessed by other units in the network. If the power-saving network unit is neither master nor relay node in the network, then the mode setting means preferably allows the power-saving network unit to enter the power-saving mode based on the frequency counted and/or compared by the counting/comparing means.

In still another embodiment, the power-saving network unit may further include switch means turning ON responsive to human manipulation or a human being absence signal supplied from a human being sensor. The switch means is preferably connected to the counting/comparing means. When the counting/comparing means receives an ON signal from the switch means, the counting/comparing means compulsorily outputs a signal indicating that the frequency of accesses is a reference value or less.

In still another embodiment, the power-saving network unit may further include means for deciding whether or not the power-saving network unit is connected to the network. An output of the deciding means is preferably input to the storage means, and the network configuration information that has been stored on the storage means is preferably modified based on a result of decision made by the deciding means.

In still another embodiment, the power-saving network unit may further include means for monitoring and revising the configuration of the network at regular intervals. An output of the monitoring means is preferably input to the storage means, and the network configuration information that has been stored on the storage means is preferably modified based on the network configuration revised by the monitoring means.

In still another embodiment, each of the peripheral I/O and digital processing means is preferably divided into: a circuit section needed in relaying information from the other units connected to the network; and the other circuit sections only the circuit sections, other than the circuit section needed in relaying the information, of the peripheral I/O and digital processing means are preferably allowed to enter the power-saving mode.

According to the present invention, it is determined based on the configuration of a network whether or not a power-saving network unit may enter a power-saving mode. For example, if the power-saving network unit is master of the other units or a relay node located between a pair of other units in the network, then the power-saving network unit is prohibited from entering the power-saving mode, and is locked to the normal operation mode. The conventional power-saving network unit always enters the power-saving mode no matter whether the unit is a relay node or not. Thus, according to the conventional power conservation techniques, it is necessary to get the network unit ready for data exchange by making the unit transition back into the normal operation mode. In contrast, since such a mode transition is not required by the present invention, data can be exchanged faster than the conventional network.

In particular, according to the present invention, if the power-saving network unit has been disconnected from, or subsequently reconnected to, the network, then such disconnection or reconnection is recognized by the deciding means. Based on the information recognized, the network configuration information stored on the storage means is modified. Thus, it is possible to appropriately get the power-saving network unit switched into the power-saving mode or locked to the normal operation mode.

Also, according to the present invention, even if the network configuration has been changed, the monitoring means monitor the network configuration and feeds a revised network configuration back to the storage means at regular intervals. Thus, no matter whether the network configuration is changed or not after that, all the power-saving network units can be appropriately switched into the power-saving mode or locked to the normal operation mode.

Furthermore, according to the present invention, if the power-saving network unit is required just for the information relay purposes, then only the circuit section thereof needed in relaying information may be locked to the normal operation mode, while the other circuit sections may enter the power-saving mode. Thus, the power can be further saved.

DESCRIPTION OF THE PREFERRED EMBODIMENTS

Hereinafter, preferred embodiments of the present invention will be described with reference to the accompanying drawings.

EMBODIMENT 1

Figure 1:
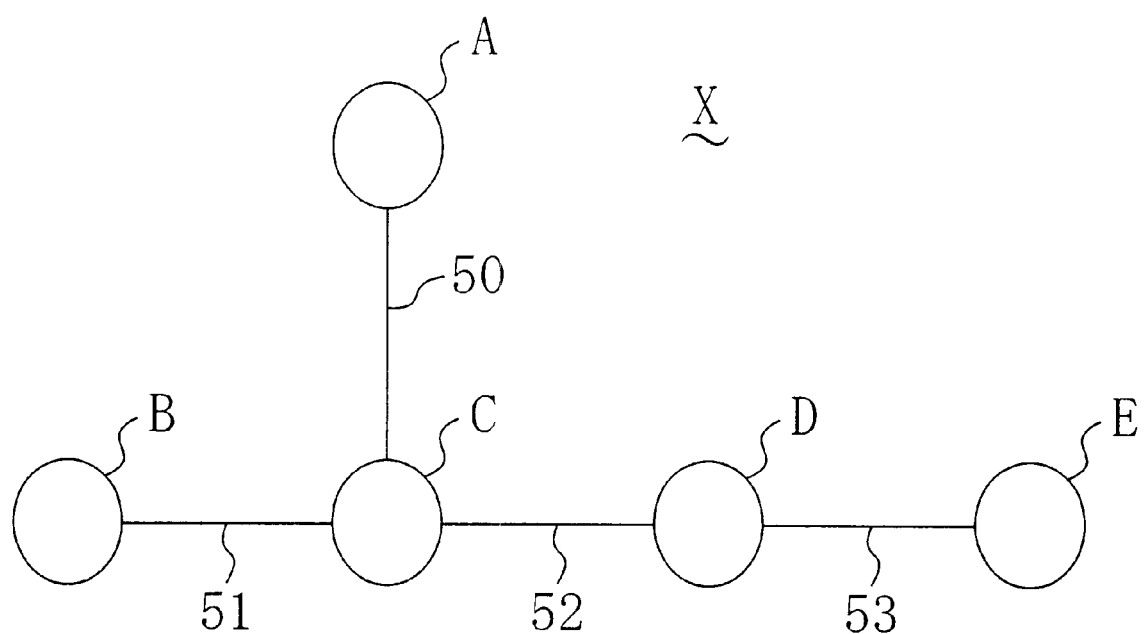
FIG. 1 illustrates an overall configuration of a network including a power-saving network unit according to a first embodiment e present invention.
Figure 2:
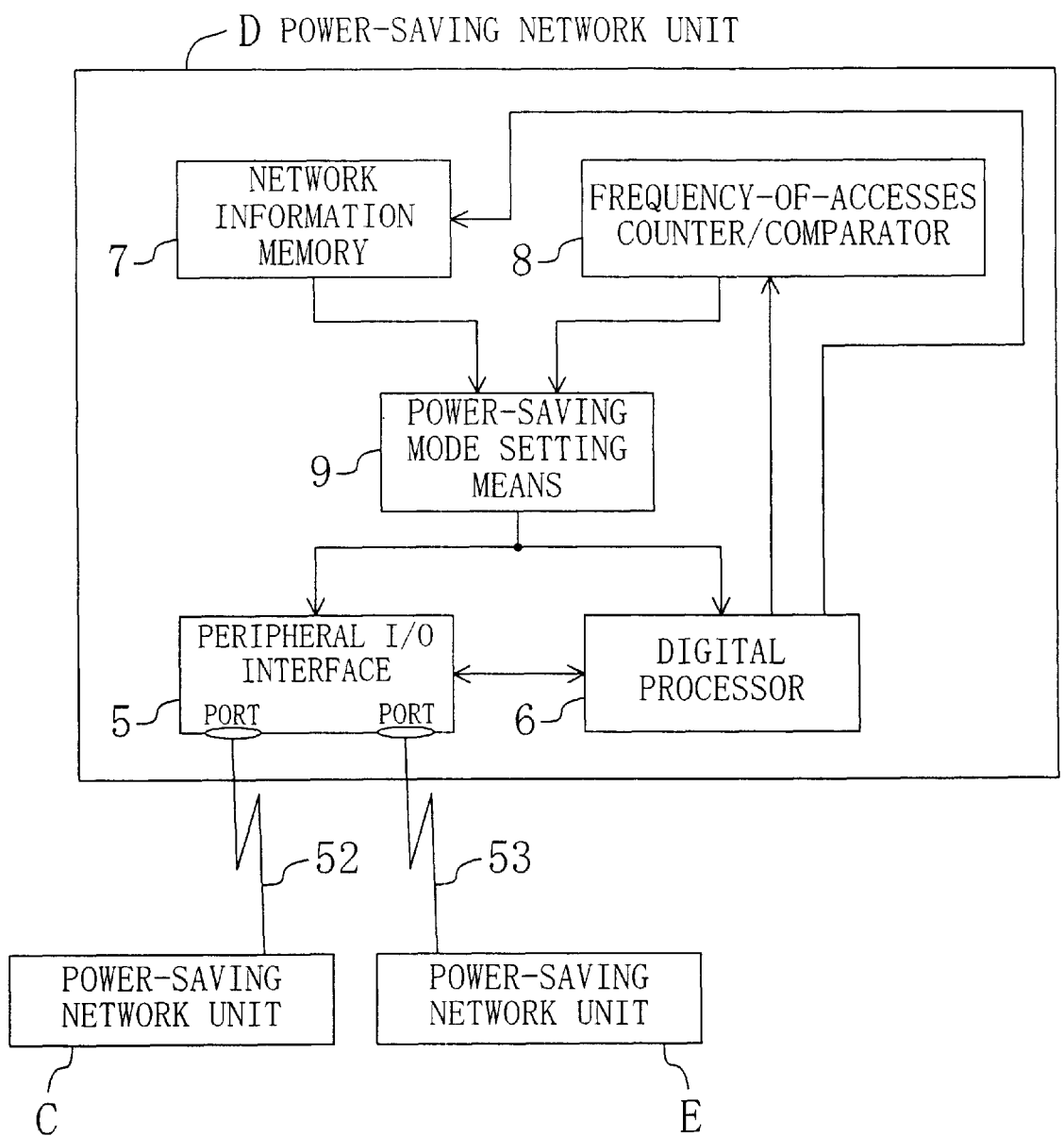
FIG. 2 is a block diagram illustrating an internal configuration of the power-saving network unit according to the first embodiment.
Figure 3:
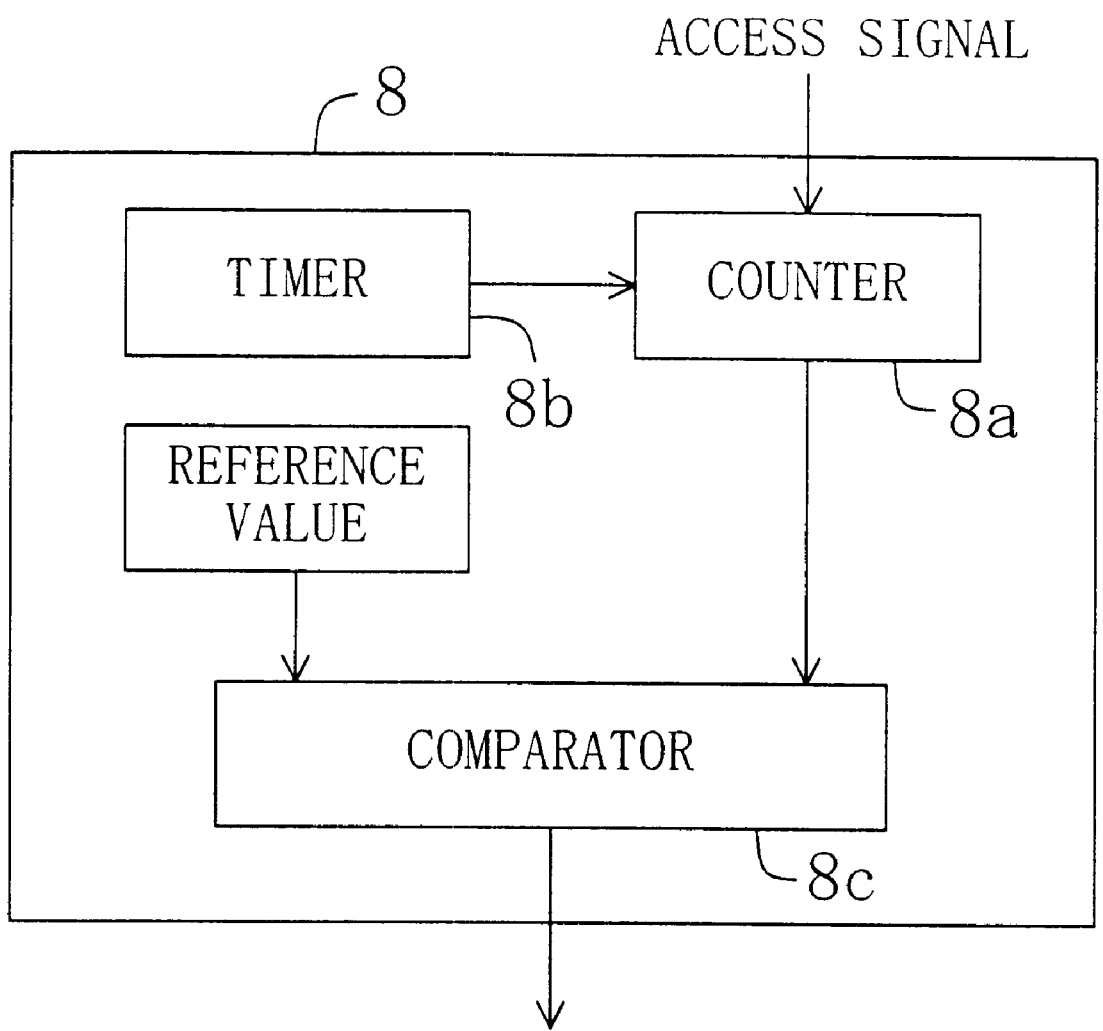
FIG. 3 is a block diagram illustrating an internal configuration of a frequency-of-accesses counter/comparator included in the power-saving network unit according to the first embodiment

FIGS. 1 through 3 illustrate a first exemplary embodiment of the present invention. FIG. 1 illustrates an overall configuration of a network X, in which five power-saving network units A, B, C, D and E according to the present invention are coupled together. As shown in FIG. 1, the network unit C is connected to the network units A, B and D through three transmission lines 50, 51 and 52, respectively, while the network unit D is connected to the network unit E through a transmission line 53. The power-saving network units A through E may be implemented as CPUs, DVD-ROMs, digital video cameras (DVCs), printers, scanners or video decks. The transmission lines 50 through 53 are implementable as cables, fiber-optics cables or signal lines. In the illustrated example, all of the units A through E connected to the network X are inventive power-saving network units. Alternatively, the network x may be a mixture of ordinary network units, which operate only in normal operation mode, not in power-saving mode, and the inventive power-saving network units.

Each of these power-saving network units A through E has the same internal configuration. Referring to FIG. 2, the common internal configuration will be described while taking the power-saving network unit D up as a typical example.

The power-saving network unit D shown in FIG. 2 includes a peripheral I/O interface 5 and a digital processor 6. The peripheral I/O interface 5 is coupled to the two transmission lines 52 and 53 for receiving signals from the power-saving network units C and E and converting these signals into digitized information or outputting digital information from the unit D itself to the units C and E. The digital processor 6 receives the information from the network units C and E by way of the peripheral I/O interface 5. Then, the processor 6 digitally processes the received information by performing its own function (e.g., that of a DVC) and outputs the processed information to the network units C and E via the I/O interface 5 if necessary. Also, the digital processor 6 transmits interconnection information about the associated power-saving network unit D to the other digital processors 6 in the remaining network units A, B, C and E while the network unit D is connected to the network X. Or the digital processor 6 receives interconnection information about the other network units A, B, C and E from their digital processors 6. In this manner, the digital processor 6 understands the interconnection status of the overall network X. Examples of the interconnection information include: the number or priority order of ports provided for the peripheral I/O interface 5; and whether or not these ports are connected to other network units. Also, on receiving data from other network units, each of these digital processors 6 outputs an access signal.

Although not shown in FIG. 2, the peripheral I/O interface 5 and the digital processor 6 include a mechanism for reducing power consumption by halving the operating frequency. That is to say, while the mechanism is being activated, the unit is in the power-saving mode. On the other hand, while the mechanism is being deactivated, the unit is in the normal operation mode.

As shown in FIG. 2, the power-saving network unit D further includes a network information memory 7. The memory 7 stores thereon the information about the configuration of the network X that has been understood by the digital processor 6, i.e., the interconnection relationship among the network units A through E, as network information. The power-saving network unit D further includes a frequency-of-accesses counter/comparator 8 with an internal configuration such as that shown in FIG. 3. As shown in FIG. 3, the frequency-of-accesses counter/comparator 8 includes: a counter 8a; a timer 8b; and a comparator 8c. The timer 8b clocks predetermined timing when the counter 8a should be cleared at regular intervals (e.g., one minute). When the time comes, the timer 8b outputs a reset signal. The counter 8a receives the access signal from the digital processor 6, counts the number of times the access signal has been received and resets its count at zero when the reset signal is supplied thereto from the timer 8b. The comparator 8c receives the count from the counter 8a and a predetermined reference value, which is the minimum number of times (e.g., five times) required for switching the peripheral I/O interface 5 and digital processor 6 into the power-saving mode. The comparator 8c compares the count of the counter 8a to the reference value and outputs the result of comparison as frequency-of-accesses information. The internal configuration of the frequency-of-accesses counter/comparator 8 is not limited to that exemplified in FIG. 3, but may be readily modified in various manners. For instance, if the associated power-saving network unit D has not been accessed for a predetermined time or more, then the frequency-of-accesses counter/comparator 8 may output access information representing the fact to power-saving mode setting means 9.

As shown in FIG. 2, the power-saving network unit D further includes the power-saving mode setting means 9, which receives the network information from the network information memory 7 and the frequency-of-accesses information from the frequency-of-accesses counter/comparator 8. Based on these items of information, the mode setting means 9 determines whether or not the peripheral I/O interface 5 and the digital processor 6 may enter the power-saving mode. If these sections 5 and 6 may enter the power-saving mode, then the mode setting means 9 outputs a power-saving mode instruction signal to the peripheral I/O interface 5 and digital processor 6. Responsive to the power-saving mode instruction signal, the peripheral I/O interface 5 and digital processor 6 activate their built-in power conserving mechanism to transition into the power-saving mode. It should be noted that the power-saving mode setting means 9 is implementable by means of a software program or a hardware component.

Hereinafter, it will be described in further detail how the power-saving mode setting means 9 determines whether or not the power-saving mode should be entered.

As described above, network information is stored on the network information memory 7. Since the network information represents an interconnection relationship among the five power-saving network units A through E belonging to the network X, the same information is stored on every network information memory 7 of the network units A through E. The (node) numbers of the power-saving network unit A through E are different from each other though. The power-saving mode setting means 9 gives priority to the network information supplied from the network information memory 7 over the frequency-of-accesses information supplied from the frequency-of-accesses counter/comparator 8. First, the mode setting means 9 determines based on the network information supplied from the memory 7 whether or not the associated network unit is "master" of the other units in the network X and whether or not the associated unit is a data transmission relay node between a pair of other units in the network X. For example, if the network unit A is "master" of the network X shown in FIG. 1, then the power-saving mode setting means 9 of the "master" network unit A does not output the power-saving mode instruction signal irrespective of the contents of the frequency-of-accesses information supplied from the frequency-of-accesses counter/comparator 8. Also, the power-saving mode setting means 9 of the network units C and D, which are relay nodes in the network X shown in FIG. 1, do not output the power-saving mode instruction signal, either, irrespective of the contents of the frequency-of-accesses information supplied from the frequency-of-accesses counter/comparator 8.

On the other hand, if the associated network unit is neither "master" nor relay node (i.e., in the network units B and E in the network X), the power-saving mode setting means 9 selectively determine based on the frequency-of-accesses information supplied from the frequency-of-accesses counter/comparator B whether or not the power-saving mode instruction signal should be output. Specifically, if it has been determined based on the frequency-of-accesses information that the number of times the access signal has been received within the predetermined time is equal to or less than the reference value, then the power-saving mode instruction signal is output. Otherwise, the power-saving mode instruction signal is not output.

Thus, according to the first embodiment, the power-saving mode setting means 9 of the master network unit A and the relay node network units C and D in the network X do not output the power-saving mode instruction signal irrespective of the frequency-of-accesses information. Accordingly, even if the number of times the access signal has been received is equal to or less than the reference value, these network units A, C and D are locked to the normal operation mode without entering the power-saving mode. Therefore, it is possible for the "master" network unit A to always manage the communications from the other "slave" network units B through E in the network X. In addition, it is always possible to transmit data from the network unit A to the unit B through the unit C or from the network unit B to the unit E via the units C and D. Moreover, it is no longer necessary to make the relay nodes C and D resume their normal operation from the power-saving mode unlike the conventional network. As a result, data can be transmitted at higher speeds via relay nodes.

Furthermore, in the non-master and non-relay-node network units B and E in the network X, the mode setting means 9 may determine based on the frequency-of-accesses information supplied from the counter/comparator 8 that the number of times the access signal has been received is the reference value or less. In such a situation, the mode setting means 9 outputs the power-saving mode instruction signal to make the peripheral I/O interface 5 and digital processor 6 enter the power-saving mode. Thus, the power consumption can be reduced effectively.

EMBODIMENT 2

Figure 4:
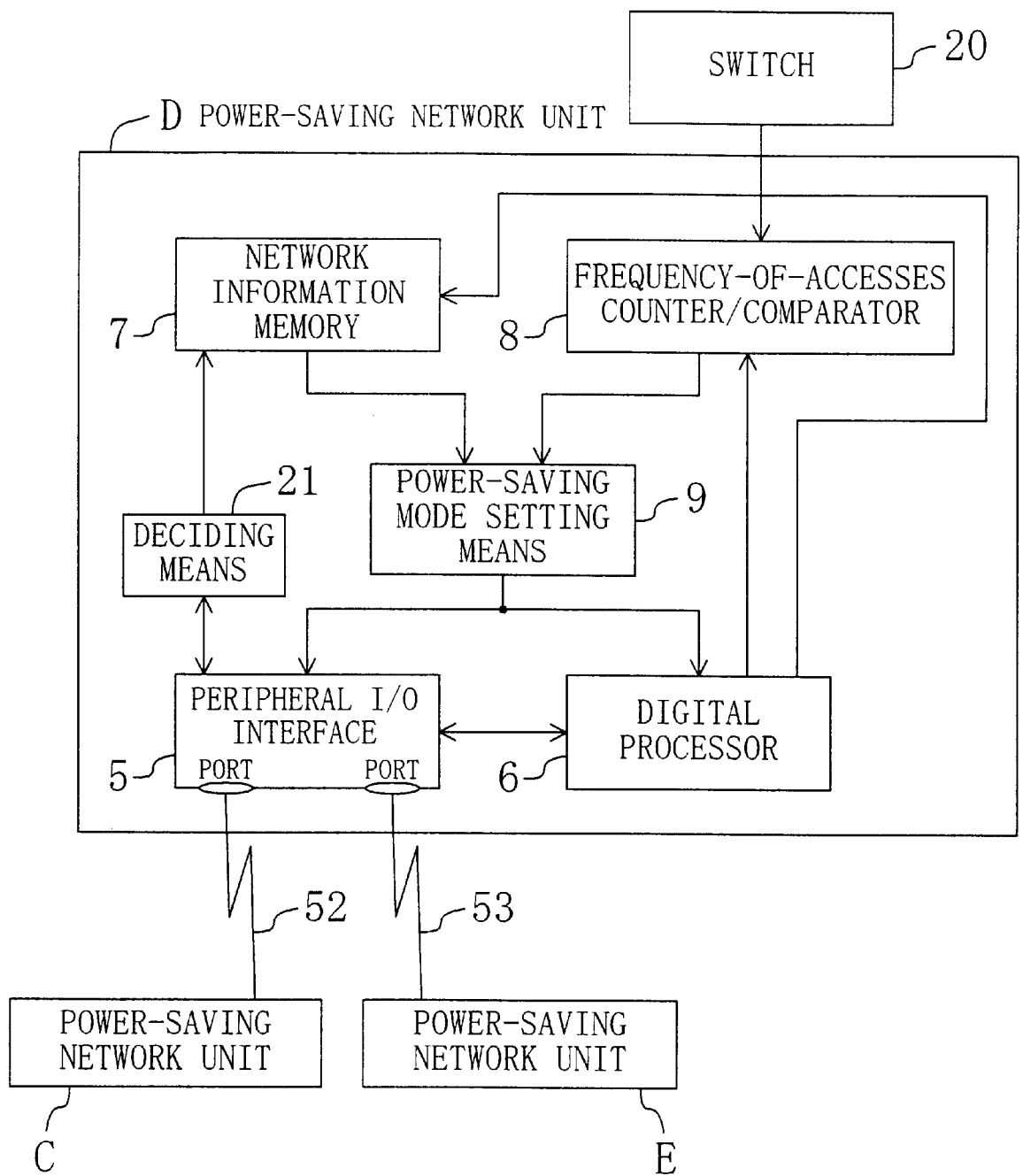
FIG. 4 is a block diagram illustrating an internal configuration of a power-saving network unit according to a second embodiment of the present invention.

FIG. 4 illustrates a configuration of a power-saving network unit according to a second exemplary embodiment of the present invention.

As shown in FIG. 4, the network unit D further includes a switch 20, which is turned ON either manually by a user when needed or automatically responsive to a human being absence signal supplied from a human being sensor disposed near the network unit D. When the switch 20 is turned ON, the output of the switch 20 is input to the frequency-of-accesses counter/comparator 8. In response, the frequency-of-accesses counter/comparator 8 makes the comparator 8c shown in FIG. 3 compulsorily output frequency-of-accesses information indicating that the number of times the access signal has been received is the reference value or less to the power-saving mode setting means 9.

As shown in FIG. 4, the network unit D further includes deciding means 21 connected to the peripheral I/O interface 5. The deciding means 21 decides whether or not the transmission lines 52 and 53 such as cables are connected to the associated ports of the peripheral I/O interface 5. The result of decision made by the deciding means 21 is input to the network information memory 7. Based on the result of decision supplied from the deciding means 21, the network information memory 7 knows that the network unit D has been disconnected from the network X or reconnected thereto after the disconnection and modifies the information about the network configuration stored thereon. The modified network configuration information is output as network information to the power-saving mode setting means 9. It should be noted that the deciding means 21 is implementable by means of a software program or a hardware component.

Thus, according to the second embodiment, if the switch 20 has been turned ON manually by the user or responsive to the human being absence signal supplied from the human being sensor, then it is determined that the associated network unit does not have to operate anymore. In such a situation, the frequency-of-accesses information indicating that the frequency of accesses is less than normal is compulsorily output from the frequency-of-accesses counter/comparator 8 of the network unit to the power-saving mode setting means 9. Accordingly, if the network unit in question is neither master nor relay node, then the power-saving mode setting means 9 can instantaneously output the power-saving mode instruction signal by the user's manipulation or responsive to the human being absence signal. Thus, the network unit can transition into the power-saving mode quickly.

Also, if the cable that has been connected to an associated port of the peripheral I/O interface 5 in any network unit is disconnected or reconnected, then the deciding means 21 can recognize the disconnection or reconnection quickly to modify the network information stored on the network information memory 7. Accordingly, the power-saving mode setting means 9 selectively outputs the power-saving mode instruction signal depending on the modified network information. Thus, as soon as the network unit is disconnected from the network X, the disconnected network unit can enter the power-saving mode. On the other hand, hardly when the network unit is reconnected to the network X, the network unit can resume its normal operation from the power-saving mode.

EMBODIMENT 3

Figure 5:
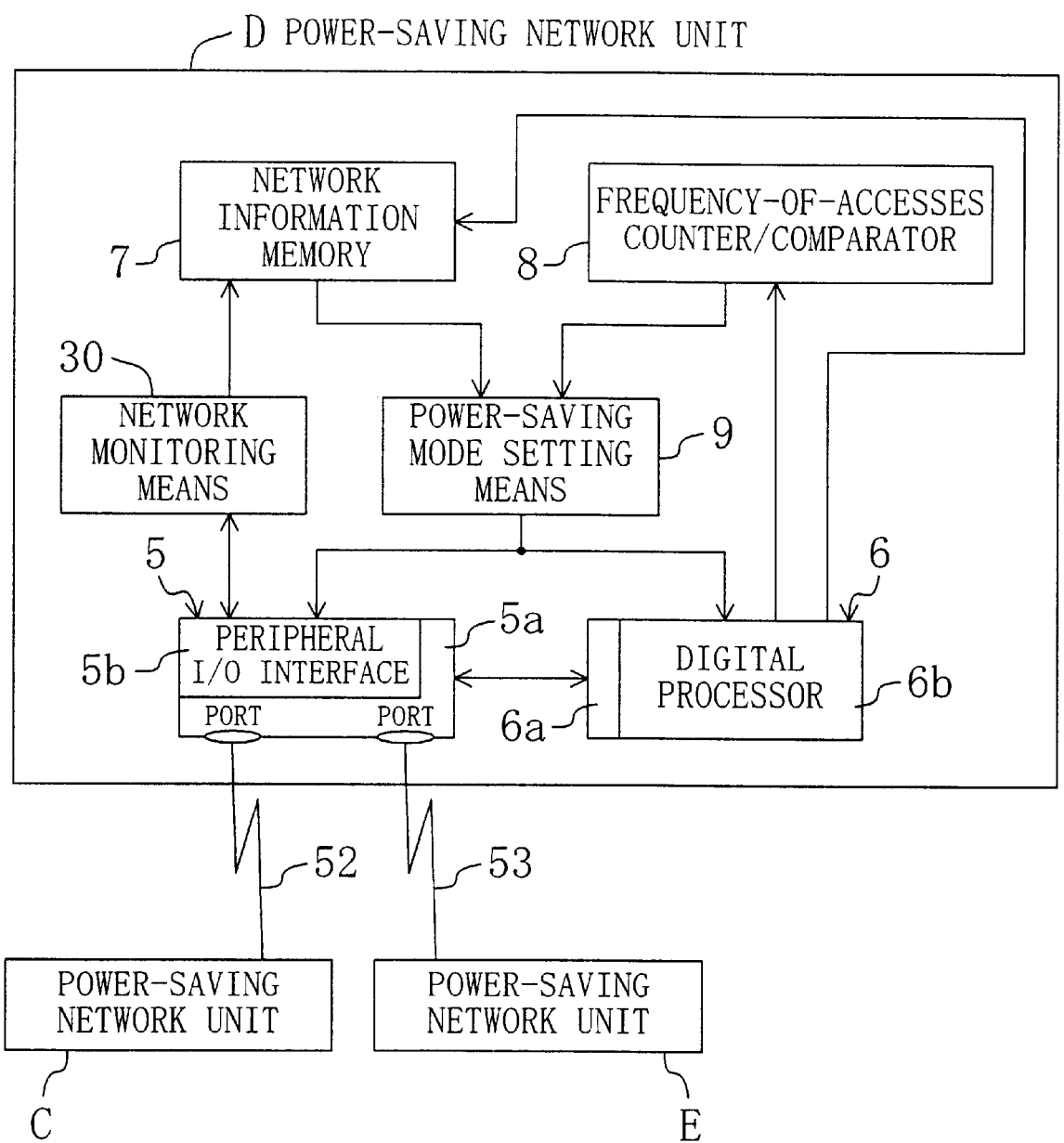
FIG. 5 is a block diagram illustrating an internal configuration of a power-saving network unit according to a third embodiment of the present invention.

FIG. 5 illustrates a configuration of a power-saving network unit according to a third exemplary embodiment of the present invention.

As shown in FIG. 5, the network unit D further includes network monitoring means 30, which is connected to the peripheral I/O interface 5. If any network unit has been disconnected from, or reconnected to, the network X and/or has entered the power-saving mode, then the network monitoring means 30 resets the network configuration (or topology in a LAN) already defined. Then, interconnection information is exchanged among all the network units to revise the interconnection status of these network units, which is output to the network information memory 7. It should be noted that the network monitoring means 30 is implementable by means of a software program or a hardware component.

Also, as shown in FIG. 5, each of the peripheral I/O interface 5 and digital processor 6 is divided into a circuit section 5a or 6a required for connecting the transmission line 52 or 53 thereto and the other circuit section 5b or 6b.

Thus, according to the third embodiment, every time the network X has been modified, the network monitoring means 30 reexamines the modified network X to update the network information stored on the network information memory 7. Accordingly, if the configuration of the network X has been changed, the power-saving mode setting means 9 can appropriately output the power-saving mode instruction signal. That is to say, the "master" or relay node network unit can be locked to the normal operation mode without entering the power-saving mode.

Also, in the relay node network units C and D, if the frequency of accesses is equal to or less than the reference value, only the circuit section 5a or 6a of the peripheral I/O interface 5 or digital processor 6 required for connecting the associated transmission line thereto may operate normally while the other section 5b or 6b may be in the power-saving mode. According to the first and second embodiments, all the peripheral I/O interfaces 5 and all the digital processor 6 should operate normally. In contrast, since only the required section thereof 5a or 6a should operate normally according to this embodiment, the power can be further conserved.

What is claimed is:

1. A power-saving network unit, which is connected to a network made up of a plurality of units that are coupled together through transmission lines and which is operative in either normal operation or power-saving mode, the power-saving network unit comprising:

information storage means for storing information representing a configuration of the network; and power-saving mode setting means for determining, based on the network configuration information stored on the storage means, whether or not the power-saving network unit may enter the power-saving mode.

2. The power-saving network unit of claim 1, further comprising:

peripheral I/O means connected to the network; and digital processing means for receiving information from other units in the network and processing the information, wherein if the mode setting means has determined that the power-saving network unit may enter the power-saving mode, the peripheral I/O and digital processing means receive an instruction signal from the mode setting means to enter the power-saving mode.

3. The power-saving network unit of claim 1, wherein if the power-saving network unit is master of the other units in the network, then the mode setting means prohibits the power-saving network unit from entering the power-saving mode.

4. The power-saving network unit of claim 1, wherein if the power-saving network unit is a relay node located between a pair of other units in the network, then the mode setting means prohibits the power-saving network unit from entering the power-saving mode.

5. The power-saving network unit of claim 1, wherein if the power-saving network unit is neither master nor relay node in the network, then the mode setting means removes prohibition against the power-saving network unit's entering the power-saving mode.

6. The power-saving network unit of claim 5, further comprising counting/comparing means for counting and/or comparing a frequency with which the power-saving network unit has been accessed by other units in the network, wherein if the power-saving network unit is neither master nor relay node in the network, then the mode setting means allows the power-saving network unit to enter the power-saving mode based on the frequency counted and/or compared by the counting/comparing means.

7. The power-saving network unit of claim 6, further comprising switch means turning ON responsive to human manipulation or a human being absence signal supplied from a human being sensor, wherein the switch means is connected to the counting/comparing means, and wherein when the counting/comparing means receives an ON signal from the switch means, the counting/comparing means compulsorily outputs a signal indicating that the frequency of accesses is a reference value or less.

8. The power-saving network unit of claim 1, further comprising means for deciding whether or not the power-saving network unit is connected to the network, wherein an output of the deciding means is input to the storage means, and wherein the network configuration information that has been stored on the storage means is modified based on a result of decision made by the deciding means.

9. The power-saving network unit of claim 1, further comprising means for monitoring and revising the configuration of the network at regular intervals, wherein an output of the monitoring means is input to the storage means, and wherein the network configuration information that has been stored on the storage means is modified based on the network configuration revised by the monitoring means.

10. The power-saving network unit of claim 2, wherein each of the peripheral I/O and digital processing means is divided into: a circuit section needed in relaying information from the other units connected to the network; and the other circuit sections, and wherein only the circuit sections, other than the circuit section needed in relaying the information, of the peripheral I/O and digital processing means are allowed to enter the power-saving mode.

11. The power-saving network unit of claim 1, further comprising a peripheral I/O means which is powered down when the power saving network unit enters the power saving state.

* * * * *